United States Patent Office 2,731,446
Patented Jan. 17, 1956

2,731,446
POLYURETHANES FROM PIPERAZINE

Emerson L. Wittbecker, West Chester, Pa., assignor to E. I. du Pont de Nemours and Company, Wilmington, Del., a corporation of Delaware No Drawing. Application March 30, 1953,
Serial No. 345,728

12 Claims. (Cl. 260—77.5)

This invention relates to the preparation of new compositions of matter comprising high molecular weight, high melting polymers suitable for the preparation of orientable films and fibers and, in particular, relates to piperazine polyurethanes having melting points in excess of 200° C. prepared from dihydric alcohols.

Polyurethanes have been explored very systematically in Germany over the past several years as candidate polymers for the preparation of synthetic films and fibers. As a result, small scale production facilities are in use for the production of "Perlon U" a high molecular weight polyurethane from 1,4 butane diol and hexamethylenediisocyanate having the recurring unit, $$[-O-(CH_2)_4-O-C-NH-(CH_2)_6-NH-C-]_n$$
$$\phantom{[-O-(CH_2)_4-O-}\overset{\|}{O}\phantom{-NH-(CH_2)_6-NH-}\overset{\|}{O}$$

The polyurethanes are structurally allied to the polyamides the recurring link being NHCOO in place of NHCO. Filamentary products such as yarn and bristles are stiffer than the polyamides and in general possess a lower water-absorption. In the fiber field "Perlon U" is inferior to commercial nylon in respect to much lower softening point, more difficult drawing characteristics, lower tenacity and elongation, harsher feel, and inferior dye receptivity. The melting point of 175–180° C. is considered too low for safe ironing.

It is an object of this invention to prepare high melting polyurethanes suitable for the production of flexible film and filamentary products. It is a further object to provide polyurethane fibers suitable for use in the apparel field and having softening points which are adequately high for safe ironing. Other objects will become apparent from the description of the invention which follows and the appended claims.

The objects of this invention are accomplished by preparing high molecular weight fiber-forming polyurethanes obtained by condensing piperazine and a dihydric alcohol selected from the group consisting of ethylene glycol, pentaglycol, 1,4-cyclohexanediol and bis-2,2(4-hydroxy-cyclohexyl) propane. These piperazine polyurethanes have melting points in excess of 200° C. and can be cold-drawn into highly oriented shaped articles. They are composed of recurring structural units of the general formula

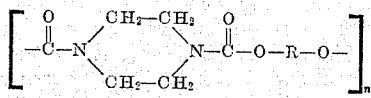

where $n$ is a large whole number, the —O—R—O group is the residue of the dihydric alcohol used and the remainder of the unit may be regarded as the residue of 1,4-piperazinedicarboxylic acid. Accordingly, these polymers may be designated as polyesters of 1,4-piperazinedicarboxylic acid.

A preferred method for preparing these piperazine polyurethanes involves mixing an aqueous emulsion system containing in separate phases piperazine and the bis-chloroformate of a dihydric alcohol. The condensation may be carried out relatively low temperatures, in the neighborhood of room temperature, and preferably is conducted in the presence of an HCl acceptor. This reaction may be illustrated as follows:

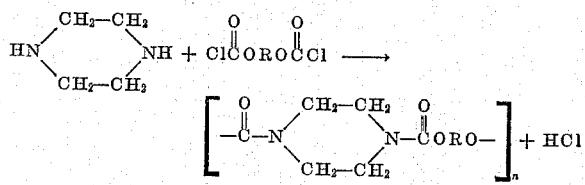

The bis-chloroformates of dihydric alcohols are prepared by reacting one mol of the dihydroxy compound with more than 2 mols of phosgene. With aliphatic glycols, this reaction goes readily to completion and the crude product can be used directly in the reaction with piperazine to form polyurethanes, although it is preferred to distill the bis-chloroformate if the boiling point is reasonably low.

The following examples illustrate various methods of preparing the new polymers of this invention and the effect of variations in operating conditions on the products obtained, but are not to be construed as limiting the scope of the invention. In these examples the inherent viscosity values of the product are given as an indication of the degree of polymerization obtained. In view of the relative ease with which these values are determined, they provide a useful method of evaluating the effect of process variables on a given type of polymerization. The values may be misleading when used to compare different types of polyurethanes, but in general, those having values of at least about 0.2 were suitable for spinning. In determining these values, viscosimeter flow times were obtained at 25.0° ± 0.1 C. for a solvent for the polyurethane and for a solution of the polyurethane in the solvent at a concentration of 0.5 gram per 100 cu. centimeters of solution. The inherent viscosity value was then calculated as 2 times the natural logarithm of the relative viscosity of the solution compared to that of the pure solvent. Unless otherwise stated, the solvent used in determining the inherent viscosities in the following examples was meta-cresol. The melting point is taken as the lowest temperature at which a fresh polymer sample leaves a wet molten trail as it is stroked with moderate pressure across a clean heated metal surface, such as a brass block. Bulk polymer is supported manually or with tweezers, and powder or the like is manipulated with a spatula.

EXAMPLE 1

*Polyurethane from piperazine and ethylene-bis-chloroformate*

Ethylene-bis-chloroformate was prepared from ethylene glycol and phosgene by the method described by N. Rabjohn in the Journal of the American Chemical Society, volume 70, page 1182 (1948). The ethylene-bis-chloroformate was reacted with piperazine in an aqueous emulsion system in the following manner. An emulsion was prepared from 200 cc. of benzene and 200 cc. of water containing 2.0 grams of "Duponol" ME, a crude grade of sodium lauryl sulphate. To this was added 24.2 cc. of an aqueous solution containing 4.3 grams of piperazine and 20 cc. of an aqueous solution containing 4 grams of sodium hydroxide. The emulsion was cooled to 5° C. and 20 cc. of a benzene solution containing 9.35 grams of ethylene bis-chloroformate was added over a period of about two minutes with constant stirring. The polyurethane flocculated during the addition. The polymerization mixture was stirred for an additional 2 minutes and the flocculation of the polymer was completed by adding acetone. The polyethylene 1,4-piperazinedicarboxylate was filtered, washed with water, and dried. It had an inherent viscosity of 1.51. A clear self-supporting amorphous film was obtained from this polyurethane by melt pressing the polymer at 260° C. When placed in water, the amorphous film absorbed 16% water. The film crystallized rapidly, however, and when the crystalline film was dried and placed in water, it absorbed 12.5% water. The polymer had a density of 1.35 and melted at 245° C. The crystalline powder, as obtained from the polymerization, dissolves in cold chloroform and meta-cresol and in hot cyclohexanone and dimethylformamide. An 80% by volume solution of ethanol in water starts to dissolve the amorphous film, but it crystallizes and is no longer soluble.

EXAMPLE 2

*Polyurethane from piperazine and pentaglycol-bis-chloroformate*

An emulsion was prepared in an ice-jacketed Waring Blendor from 200 cc. of carbon tetrachloride, 200 cc. of water, 20 cc. of a 10% aqueous "Duponol" ME solution, 20.1 cc. of water containing 0.10 mol of sodium hydroxide and 30.35 cc. of an aqueous solution containing 0.05 mol of piperazine. To the stirring emulsion was added rapidly 0.05 mol of pentaglycol-bis-chloroformate in 25 cc. carbon tetrachloride. The resulting emulsion was broken by boiling off the carbon tetrachloride on a steam bath. The polymer was filtered off, washed thoroughly with water and dried. A 77% yield of poly-2,2-dimethyl-trimethylene 1,4-piperazinedicarboxylate having an inherent viscosity of 0.89 in meta-cresol was obtained. This polyurethane exhibited a sticking temperature of 227° C. and could be melted around 250° C. without decomposition. The polymer was melted and held at 260° C. for an hour without any sign of decomposition.

EXAMPLE 3

*Preparation of the bis-chloroformate of 1,4-cyclohexanediol*

Into a 3-neck flask of 500 cc. capacity equipped with two Dry Ice condensers and a mechanical stirrer was placed 116 g. (1.0 mol) of a cis and trans mixture of 1,4-cyclohexanediol dispersed in 100 cc. benzene. Approximately 200 cc. of phosgene was then condensed into the flask. As the 1,4-cyclohexanediol reacted with the phosgene it went into solution. The solution was allowed to stand overnight. Nitrogen was then bubbled through the solution and vacuum applied to drive off all the excess phosgene and benzene. The bis-chloroformate of 1,4-cyclohexanediol remained as a white crystalline solid and was used as prepared.

EXAMPLE 4

*Separation of the cis and trans isomers of the bis-chloroformate of 1,4-cyclohexanediol*

Twenty-four grams of the mixture of cis and trans isomers of the bis-chloroformate of 1,4-cyclohexanediol was dissolved in 20 cc. of benzene, and a crop of crystals precipitated out when the benzene solution was cooled in an ice bath. These crystals were recrystallized once more from 20 cc. benzene giving the trans isomer of the bis-chloroformate of 1,4-cyclohexanediol with a melting point at 113–114° C.

The two benzene filtrates were combined and allowed to stand overnight in which time another crop of crystals had formed. The crystals were filtered off and the filtrate which was almost free of benzene was cooled in an ice bath and stirred with a glass rod to induce crystallization. The solid which formed was fairly pure cis isomer of the bis-chloroformate of 1,4-cyclohexanediol since it had a melting range of 38–42° C.

EXAMPLE 5

*Polyurethanes from the bis-chloroformates of 1,4-cyclohexanediol and piperazine*

To a Waring Blendor jar at room temperature was added 170 cc. of water, 10.6 g. (0.10 mol) of sodium carbonate, 50 cc. (0.05 mol) piperazine solution, 1.0 g. of "Duponol" ME and 15 cc. of benzene. To the stirred emulsion was added 30 cc. of a benzene solution containing 0.05 mol of mixed cis-trans bis-chloroformates of 1,4-cyclohexanediol. Acetone was added to break up the emulsion, and the polymer was washed with hot water and dried. This cis-trans form of poly-1,4-cyclohexylene 1,4-piperazinedicarboxylate had an inherent viscosity of 2.04 and a polymer melt temperature of 275° C.

The trans form of this polymer was prepared with an inherent viscosity of 1.01 and had a polymer melt temperature greater than 390° C. The cis form of this polymer was prepared with an inherent viscosity of 0.30 and had a polymer melt temperature of 275° C.

EXAMPLE 6

*Preparation of the bis-chloroformate of bis-2,2(4-hydroxycyclohexyl) propane*

The bis-chloroformate of bis-2,2-(4-hydroxycyclohexyl)-propane was prepared in the same manner as the bis-chloroformate of 1,4-cyclohexanediol. The benzene solution of the bis-chloroformate was used as prepared.

EXAMPLE 7

*Preparation of the polyurethane from piperazine and the bis-chloroformate of bis-2,2(4-hydroxycyclohexyl)-propane*

To a Waring Blendor jar at room temperature was added 170 cc. of water, 10.6 g. (0.10 mol) of sodium carbonate, 50 cc. (0.05 mol) piperazine solution, 1.0 g. "Duponol" ME and 15 cc. of benzene. To the stirred emulsion was added 50 cc. of a benzene solution containing 0.05 mol of the bis-chloroformate of bis-2,2-(4-hydroxycyclohexyl)propane. Acetone was added to break up the emulsion, and the polymer was washed and dried. The polymer had an inherent viscosity of 0.82 and had a melting point greater than 200° C.

The piperazine polyurethanes of this invention can readily be formed into filaments which are valuable as textile fibers.

EXAMPLE 8

A typical sample of piperazine polyurethane prepared from ethylene glycol as in Example 1, and having an inherent viscosity of about 1.60 and a crystalline melting point of about 215° C., was dissolved in a mixture of 12% methanol and 88% (by weight) chloroform to a concentration of 25% by weight of solution. The solution heated to 50° C. was dry-spun through a 5-hole spinneret (hole diameter 0.10 mm.) into a spinning cell maintained at 125°–130° C. with a concurrent flow of air heated to 160° C. The 5-filament yarn was collected on a bobbin at the rate of 80 yards per minute. Subsequently, the polyurethane yarn was drawn four times its original length over a plate heated to 60° C. The oriented yarn had a tenacity of 4.4 grams per denier and an elongation at break of 23%. The yarn could be dyed readily by conventional dyeing procedures.

The piperazine polyurethanes of this invention possess melting points in excess of 200° C., a property not characteristic of the great majority of polyurethanes and generally unknown to prior art polyurethanes from aliphatic diamines. The importance of this property is well recognized in the synthetic textile trade. Many of the completely synthetic polymeric fibers which show great promise of improved physical characteristics over natural fibers are limited to blends with natural fibers in the textile arts, particularly in the apparel field, because of softening temperatures too low to allow safe ironing. As previously mentioned, this deficiency is particularly true of "Perlon U," the most promising of the polyurethanes chosen for development by the Germans.

As many different embodiments of the present invention may be made without departing from the spirit and scope thereof, it is to be understood that the invention is not limited to the specific embodiments disclosed except to the extent defined in the appended claims.

What is claimed is:

1. A high melting piperazine polyurethane, the 1,4-piperazine-dicarboxylate polyester of a dihydric alcohol selected from the group consisting of ethylene glycol, pentaglycol, 1,4-cyclohexanediol and bis-2,2(4-hydroxycyclohexyl)propane.

2. A high molecular weight piperazine polyurethane having a melting point in excess of 200° C. and composed of recurring structural units of the general formula,

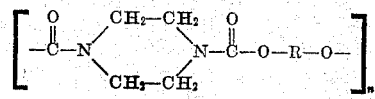

where $n$ is a large whole number and the —O—R—O— group is the residue of a dihydric alcohol selected from the group consisting of ethylene glycol, pentaglycol, 1,4-cyclohexanediol and bis-2,2(4-hydroxycyclohexyl)propane.

3. A fiber-forming polyethylene 1,4-piperazinedicarboxylate having a melting point in excess of 200° C.

4. A fiber-forming poly-2,2-dimethyltrimethylene 1,4-piperazinedicarboxylate having a melting point in excess of 200° C.

5. A fiber-forming poly-1,4-cyclohexylene 1,4-piperazinedicarboxylate having a melting point in excess of 200° C.

6. The trans form of poly-1,4-cyclohexylene 1,4-piperazinedicarboxylate having a melting point in excess of 390° C.

7. A fiber-forming piperazine polyurethane condensation product of piperazine and bis-2,2(4-hydroxycyclohexyl)propane having a melting point in excess of 200° C.

8. Fibers of polyethylene 1,4-piperazinedicarboxylate.

9. Films of polyethylene 1,4-piperazinedicarboxylate.

10. Fibers of poly-2,2-dimethyltrimethylene 1,4-piperazinedicarboxylate.

11. Fibers of poly-1,4-cyclohexylene 1,4-piperazinedicarboxylate.

12. Fibers of a piperazine polyurethane condensation product of piperazine and bis-2,2(4-hydroxycyclohexyl)-propane.

References Cited in the file of this patent
FOREIGN PATENTS

| | | |
|---|---|---|
| 880,537 | France | Jan. 4, 1943 |
| 894,763 | France | Mar. 20, 1944 |
| 892,361 | France | Jan. 7, 1944 |